United States Patent
Jacquey et al.

(10) Patent No.: US 10,211,946 B2
(45) Date of Patent: Feb. 19, 2019

(54) METHOD AND DEVICE FOR SUPPRESSING INTERFERING SIGNALS IN A SATELLITE PAYLOAD SIGNAL

(71) Applicant: AIRBUS DEFENCE AND SPACE SAS, Toulouse (FR)

(72) Inventors: Nicolas Jacquey, Toulouse (FR); Bernard Pezet, Toulouse (FR); Xavier Deplancq, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 15/741,762

(22) PCT Filed: Jul. 8, 2016

(86) PCT No.: PCT/FR2016/051758
§ 371 (c)(1),
(2) Date: Apr. 22, 2018

(87) PCT Pub. No.: WO2017/009562
PCT Pub. Date: Jan. 19, 2017

(65) Prior Publication Data
US 2018/0309536 A1    Oct. 25, 2018

(30) Foreign Application Priority Data
Jul. 10, 2015   (FR) ..................... 15 56574

(51) Int. Cl.
*H04B 1/12*   (2006.01)
*H04K 3/00*   (2006.01)
*H04B 7/185*   (2006.01)

(52) U.S. Cl.
CPC .............. *H04K 3/20* (2013.01); *H04B 1/12* (2013.01); *H04B 7/18513* (2013.01)

(58) Field of Classification Search
None
See application file for complete search history.

(56) References Cited

U.S. PATENT DOCUMENTS 6,385,181 B1 * 5/2002 Tsutsui .................. H04B 1/712
                                                            370/335
6,825,804 B1 * 11/2004 Doty .................... F41G 7/346
                                                            342/357.59
(Continued)

FOREIGN PATENT DOCUMENTS

EP   1 130 675 A2   9/2001
FR   3 002 647 A1   8/2014

OTHER PUBLICATIONS

Schmidt, "Multiple Emitter Location and Signal Parameter Estimation," IEEE Trans. Antennas and Propagation, Mar. 1986, pp. 276-280, vol. AP-34, No. 3., IEEE.

(Continued)

*Primary Examiner* — Lana N Le
(74) *Attorney, Agent, or Firm* — Im IP Law; C. Andrew Im; Chai Im

(57) ABSTRACT

A method for suppressing a spurious signal in a payload signal supplied by a receiving antenna of a payload of a satellite. The satellite also includes an array of measurement antennas supplying measurement signals. The measurement signals are combined with the payload signal. Reference weighting coefficients for weighting the measurement signals are determined as a function of the combined signals. A reference beam is formed by combining the measurement signals weighted based on the reference weighting coefficients. Anti jamming weighting coefficients for weighting the payload signal and the reference beam are determined. An anti jammed beam is formed by combining the payload (Continued)

signal and the reference beam weighed based on the corresponding anti jamming weighting coefficients.

15 Claims, 2 Drawing Sheets

(56) References Cited

U.S. PATENT DOCUMENTS

| | | | | |
|---|---|---|---|---|
| 9,438,372 | B2* | 9/2016 | Amos | H04B 7/18517 |
| 9,638,502 | B1* | 5/2017 | Herting | F42B 15/01 |
| 10,050,654 | B2* | 8/2018 | Pezet | H01Q 3/2611 |
| 2011/0070840 | A1* | 3/2011 | Nielsen | H04B 7/028 |
| | | | | 455/67.11 |
| 2011/0102263 | A1* | 5/2011 | Angeletti | H01Q 3/40 |
| | | | | 342/373 |
| 2013/0101073 | A1* | 4/2013 | Zai | G01S 7/023 |
| | | | | 375/349 |
| 2013/0102254 | A1* | 4/2013 | Cyzs | H04B 1/126 |
| | | | | 455/63.1 |
| 2014/0266851 | A1* | 9/2014 | Fink | G01S 7/36 |
| | | | | 342/14 |
| 2015/0123843 | A1* | 5/2015 | Lier | H04K 3/228 |
| | | | | 342/352 |
| 2015/0126181 | A1* | 5/2015 | Breuer | H04K 3/222 |
| | | | | 455/423 |
| 2015/0131523 | A1* | 5/2015 | Balter | H04B 7/18515 |
| | | | | 370/317 |
| 2015/0355312 | A1 | 12/2015 | Aymes et al. | |
| 2016/0142119 | A1* | 5/2016 | van Houtum | H04B 1/1036 |
| | | | | 375/260 |
| 2017/0054545 | A1* | 2/2017 | Negus | H04L 5/1423 |

OTHER PUBLICATIONS

Roy et al., "ESPRIT—Estimation of Signal Parameters Via Rotational Invariance Techniques," IEEE Trans. Acoustics, Speech, and Signal Processing, Jul. 1989, pp. 984-995, vol. 37, No. 7, IEEE.

* cited by examiner

METHOD AND DEVICE FOR SUPPRESSING INTERFERING SIGNALS IN A SATELLITE PAYLOAD SIGNAL

RELATED APPLICATIONS

This application is a § 371 application from PCT/FR2016/051758 filed Jul. 8, 2016, which claims priority from French Patent Application No. 15 56574 filed Jul. 10, 2015, each of which is herein incorporated by reference in its entirety.

TECHNICAL FIELD

The present invention relates to a method and to a device for suppressing a spurious signal received in a payload signal supplied by a reception antenna of a payload of a satellite, particularly a telecommunications satellite.

BACKGROUND OF THE INVENTION

Conventionally, a telecommunications satellite comprises a payload equipped with a reception antenna adapted to receive useful signals transmitted by terrestrial transmitters, in order to retransmit them to other terrestrial receivers.

It is not unusual for a telecommunications satellites to receive, in addition to useful signals, one or more spurious signals that disrupt the reception of said useful signals and can lead to a degradation in the services offered by the telecommunications satellite. For example, a spurious signal can correspond to a signal transmitted by an intentional jammer. The spurious signal can also correspond to a signal transmitted by an unintentional interferer, for example, a terrestrial transmitter of a terrestrial telecommunications system using the same frequency bands as the telecommunications satellite, or an incorrectly pointed terrestrial transmitter of a neighboring satellite telecommunications system.

In order to be able to attenuate or suppress a received spurious signal, knowing the position of the transmitter (jammer or interferer) that is the source of this spurious signal can be useful. Once this position is known, it is possible, for example, to intervene on site in order to interrupt the transmission of the spurious signal. However, it is not always possible for the interruption of the transmission of the spurious signal to be forced, particularly in the case of an intentional jammer located in a geographical area in which intervention is not possible.

By way of an alternative or in addition, in the case of a reception antenna with a modifiable radiation pattern (for example, in the case of a reception antenna formed by an array of elementary reception antennas), said radiation pattern can be modified so as to strongly attenuate all the signals received in the direction of arrival of the spurious signal.

However, the performance of such a solution depends on the precision of the estimation of the direction of arrival of the spurious signal. Furthermore, such a solution implies that the useful signals, which are received in substantially the same direction of arrival as the spurious signal, are also strongly attenuated. Finally, in order to be able to attenuate the direction of arrival of the spurious signal in a spatially selective manner, equipment needs to be used that is both expensive and heavy.

OBJECT AND SUMMARY OF THE INVENTION

The aim of the present invention is to overcome all or part of the limitations of the solutions of the prior art, particularly those described above, by proposing a solution that allows a spurious signal to be suppressed in an effective, simple and inexpensive manner.

To this end, and according to a first aspect, the invention relates to a method for suppressing a spurious signal in a payload signal supplied by a reception antenna of a payload of a satellite. The satellite further comprising an array of measurement antennas supplying respective signals, called "measurement signals", said suppression method comprises:
  combining each of the measurement signals with the payload signal;
  determining, as a function of the signals obtained by combining each of the measurement signals with the payload signal, weighting coefficients, called "reference coefficients", of said measurement signals for forming a beam, called "reference beam", directed toward a transmitter of the spurious signal;
  forming the reference beam by combining the measurement signals by means of the reference coefficients;
  determining, as a function of the payload signal and of the reference beam, weighting coefficients, called "anti-jamming coefficients", of said payload signal and of said reference beam for forming a beam, called "anti jammed beam", in which the spurious signal has been suppressed;
  forming the anti-jammed beam by combining the payload signal and the reference beam by means of the anti-jamming coefficients.

The payload signal corresponds to the signal supplied by the reception antenna of the payload of the satellite. Such a reception antenna generally has a relatively high maximum gain, so that the signal-to-noise ratio of the spurious signal is relatively high in the payload signal.

Consequently, by combining the payload signal with the measurement signals supplied by the measurement antennas of the array, it is possible to improve the signal-to-noise ratio of the spurious signal in each of the measurement signals. Therefore, the signal-to-noise ratio of the spurious signal in each of the measurement signals initially can be quite low, since it is improved by the combination with the payload signal.

Since the use of the payload signal allows the signal-to-noise ratio of the spurious signal to be improved, the demands on the measurement antennas can be relaxed. Consequently, said measurement antennas can have low directivity and thus can be compact, while having extensive geographical coverage.

By virtue of this improvement in the signal-to-noise ratio of the spurious signal in each of the measurement signals, obtained through combination with the payload signal, it is also possible for the direction of arrival of the spurious signal to be estimated with greater accuracy. Consequently, the reference coefficients, which allow the reference beam directed toward the transmitter of the spurious signal to be formed by means of the array of measurement antennas, can be computed with greater accuracy.

Therefore, the aim of the reference beam is to mainly recover the spurious signal, i.e. to increase the signal-to-noise-plus-interference ratio SNIR (the one or more useful signal(s) then being considered to be interference) of the spurious signal. Therefore, the aim of the reference beam is not, as is the case in the solutions of the prior art, to strongly attenuate the spurious signal in a spatially selective manner, so that the demands on the measurement antennas can be relaxed.

Due to the formation of the reference beam, it is then possible for the spurious signal to be fully or partly suppressed from the payload signal, while limiting the impact on the one or more useful signals included in the payload signal. This suppression is effected through a suitable combination of the payload signal and of the reference beam, which results in the formation of the anti-jammed beam in which the spurious signal has been suppressed.

In particular embodiments, the suppression method can further comprise one or more of the following features, taken separately or according to all the technically possible combinations.

In particular embodiments, combining each of the measurement signals with the payload signal comprises correlating said payload signal with each of said measurement signals.

In particular embodiments, the correlation is computed in the frequency domain.

In particular embodiments, the reference coefficients are computed on the ground and are applied by the satellite in order to form the reference beam.

In particular embodiments, determining the reference coefficients comprises computing a covariance matrix, called "reference covariance matrix", of the signals obtained by combining each of the measurement signals with the payload signal and also computing the reference coefficients as a function of the reference covariance matrix.

In particular embodiments, determining the anti-jamming coefficients comprises computing a covariance matrix, called "anti jamming covariance matrix", of the payload signal and of the reference beam and also computing the anti-jamming coefficients as a function of the anti-jamming covariance matrix.

In particular embodiments, the payload signal and the measurement signals being split into various frequency channels, the suppression method comprises:
  determining reference coefficients for each channel;
  forming, for each channel, a reference beam by means of the reference coefficients determined for said channel;
  determining anti-jamming coefficients for each channel;
  forming, for each channel, an anti-jammed beam by means of the anti-jamming coefficients determined for said channel.

According to a second aspect, the present invention relates to a payload of a satellite comprising a reception antenna adapted to supply a payload signal, and to a device for suppressing a spurious signal in the payload signal comprising:
  an array of measurement antennas adapted to supply respective signals, called "measurement signals";
  a combination module configured to combine each of the measurement signals with the payload signal;
  a first beam forming module configured to form a beam, called "reference beam", directed toward a transmitter of the spurious signal, by combining the measurement signals by means of weighting coefficients, called "reference weighting coefficients", determined as a function of the signals supplied by the combination module;
  a second beam forming module configured to form a beam, called "anti jammed beam", in which the spurious signal has been suppressed, by combining the payload signal and the reference beam by means of weighting coefficients, called "anti jamming coefficients".

In particular embodiments, the payload can further comprise one or more of the following features, taken separately or according to all the technically possible combinations.

In particular embodiments, the suppression device comprises a switching module adapted to supply, on an output, either the payload signal supplied by the reception antenna, or the anti-jammed beam supplied by the second beam forming module.

In particular embodiments, the combination module is configured to correlate the payload signal with each of the measurement signals.

In particular embodiments, the suppression device comprises:
  means for transmitting, to a ground station, signals supplied by the combination module and/or data computed from said signals supplied by said combination module;
  means for receiving reference coefficients computed on the ground as a function of said signals supplied by the combination module and/or as a function of said data.

In particular embodiments, the suppression device comprises a computation module configured to determine the reference coefficients as a function of the signals supplied by the combination module.

In particular embodiments, the suppression device comprises a computation module configured to determine the anti-jamming coefficients as a function of the payload signal and of the reference beam.

In particular embodiments, the maximum gain of the reception antenna is greater than the respective maximum gains of the measurement antennas.

According to a third aspect, the present invention relates to a satellite comprising a payload according to any of the embodiments of the invention.

DESCRIPTION OF THE FIGURES

The invention will be better understood upon reading the following description, which is provided by way of a non-limiting example, and with reference to the figures, in which.

Throughout these figures, identical reference numerals from one figure to the next denote identical or similar elements. For the sake of clarity, the elements that are shown are not to scale, unless otherwise specified.

DETAILED DESCRIPTION OF EMBODIMENTS

Figure 1:
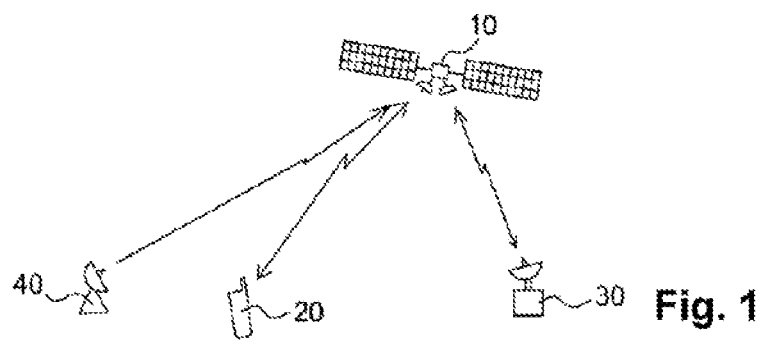
FIG. 1 is a schematic representation of a satellite telecommunications system.

FIG. 1 schematically shows a satellite system comprising a satellite 10 in an earth orbit (GEO, LEO, MEO, etc.).

As shown in FIG. 1, the satellite 10 receives a useful signal transmitted by a terrestrial terminal 20 and retransmits it to a ground station 30 or to another terrestrial terminal. Similarly, the satellite 10 can receive a useful signal from the ground station 30 and retransmit it to a terrestrial terminal 20.

In the example shown in FIG. 1, the satellite 10 also receives a spurious signal transmitted by a spurious transmitter 40, for example, a jamming transmitter or an unintentional interferer. The spurious signal disrupts the reception of the useful signal and the present invention relates to the suppression of said spurious signal in the signals received by the satellite 10.

Figure 2:
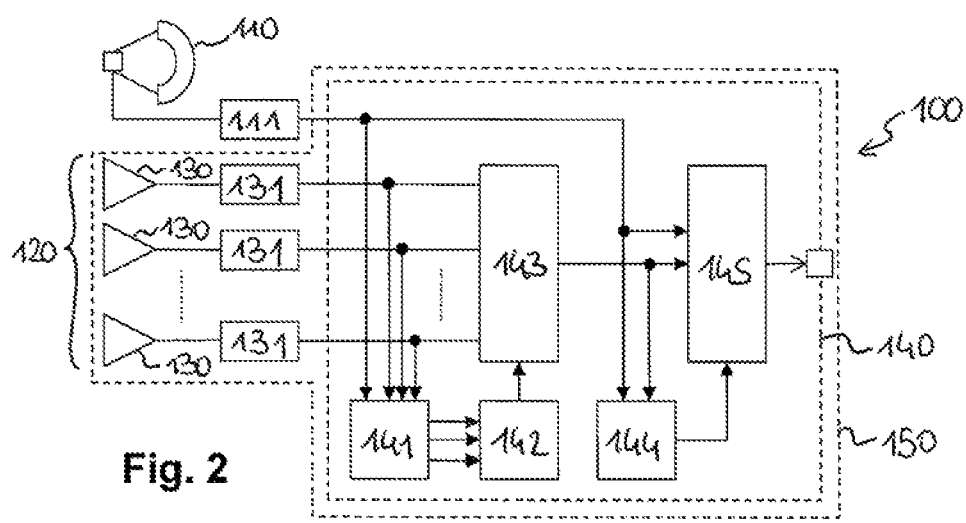
FIG. 2 is a schematic representation of an embodiment of a payload of a satellite comprising a device for suppressing a spurious signal.

FIG. 2 schematically shows an embodiment of a payload 100 of the satellite 10. For the sake of clarity, FIG. 2 only shows the main elements of the payload 100 relative to the suppression of the spurious signal, such that the payload 100 can also comprise other elements not shown in FIG. 2.

As shown in FIG. 2, the payload 100 comprises a reception antenna 110 covering a predefined geographical area, called "service area", on the surface of the earth.

The reception antenna 110 is, for example, of the type comprising a source and a reflector, or any other type of suitable antenna. Furthermore, nothing rules out, according to other examples, having a reception antenna 110 formed by an array of elementary antennas.

The reception antenna 110 is adapted to supply a payload signal comprising the useful signal received from the terrestrial terminal 20, located in the service area, as well as the spurious signal received from the spurious transmitter 40, which can be located outside the service area. As shown in FIG. 2, the reception antenna 110 is also conventionally connected to an analog reception chain 111.

The payload 100 of the satellite 10 also comprises a device 150 for suppressing a spurious signal, a particular embodiment of which is schematically shown in FIG. 2.

The suppression device 150 first comprises an array 120 of NR measurement antennas 130 adapted to supply respective signals, called "measurement signals". The measurement antennas 130 are preferably oriented so as to cover the service area of the reception antenna 110.

However, the geographical area covered by each measurement antenna 130 is preferably larger than the service area, so as to cover a greater surface area of possible locations for a spurious transmitter 40. In other words, the measurement antennas 130 are, in preferred embodiments, less directional than the reception antenna 110, so that the maximum gain of said reception antenna 110 is greater than the respective maximum gains of the measurement antennas 130.

Throughout the remainder of the description, the case in which the NR measurement antennas 130 of the array 120 are horn antennas is considered in a non-limiting manner. However, nothing rules out other types of measurement antennas 130 being considered in other embodiments.

The number NR of measurement antennas 130 of the array is two or more. However, in the case in which said array 120 comprises only two measurement antennas 130, only a 2D direction of arrival of the spurious signal can be estimated in a plane passing through the spurious transmitter 40 and said two measurement antennas 130. Consequently, the array 120 preferably comprises at least three measurement antennas 130 that are not all aligned, in order to be able to estimate a 3D direction of arrival of the spurious signal. A number NR of measurement antennas 130 that is between 5 and 10 in principle allows good performance levels to be obtained for locating a spurious signal, but a number NR of measurement antennas 130 of more than 10 can nonetheless be considered.

The distance between the adjacent measurement antennas 130 of the array 120 may be the same for each pair of adjacent measurement antennas 130 or, preferably, not be the same for all the pairs of adjacent measurement antennas 130 of the array 120, in order to improve the removal of ambiguity in the direction of arrival of the spurious signal. For the same reasons, in preferred embodiments, the measurement antennas 130 of the array 120 are not all coplanar.

In other words, the phase centers of the measurement antennas 130 are not all in the same plane.

It is to be noted that the accuracy of the estimation of the direction of arrival of the spurious signal increases with the distance between the adjacent measurement antennas 130. In preferred embodiments, the minimum distance between the adjacent measurement antennas 130 of the array is at least five times greater than the maximum wavelength $\lambda_{MAX}$ of the useful signals transmitted by the terrestrial terminals 20, or even at least ten times greater.

The distance between the two measurement antennas 130 of the array 120 that are farthest from each other is, in preferred embodiments, equal to or less than $50 \cdot \lambda_{MAX}$. Such arrangements allow the bulk associated with the array 120 of measurement antennas 130 to be limited.

The suppression device 150 also comprises analog reception chains 131, which are considered to be known to a person skilled in the art, respectively connected to the various measurement antennas 130 of the array 120.

The suppression device 150 also comprises a computation device 140 connected to the output of the analog reception chain 111 of the reception antenna 110 and to the outputs of the analog reception chains 131 of the measurement antennas 130 of the array 120.

The computation device 140 comprises, for example, analog/digital conversion means for the payload signal supplied by the reception antenna 110 and the measurement signals supplied by the measurement antennas 130 of the array 120. The computation device 140 also comprises, for example, one or more processors and storage means (magnetic hard drive, electronic memory, optical disk, etc.), in which a computer program product is stored in the form of a set of program code instructions to be executed to implement all or part of the steps of a method 50 for suppressing a spurious signal described hereafter. In one variant, the computation device 140 comprises one or more programmable logic circuit(s), of the FPGA, PLD, etc. type, and/or specific integrated circuits (ASIC) adapted to implement all or part of said steps of the method 50 for suppressing a spurious signal.

In other words, the computation device 140 comprises a set of means configured as software (specific computer program product) and/or hardware (FPGA, PLD, ASIC, etc.) to implement all or part of the steps of the method 50 for suppressing a spurious signal.

Figure 3:
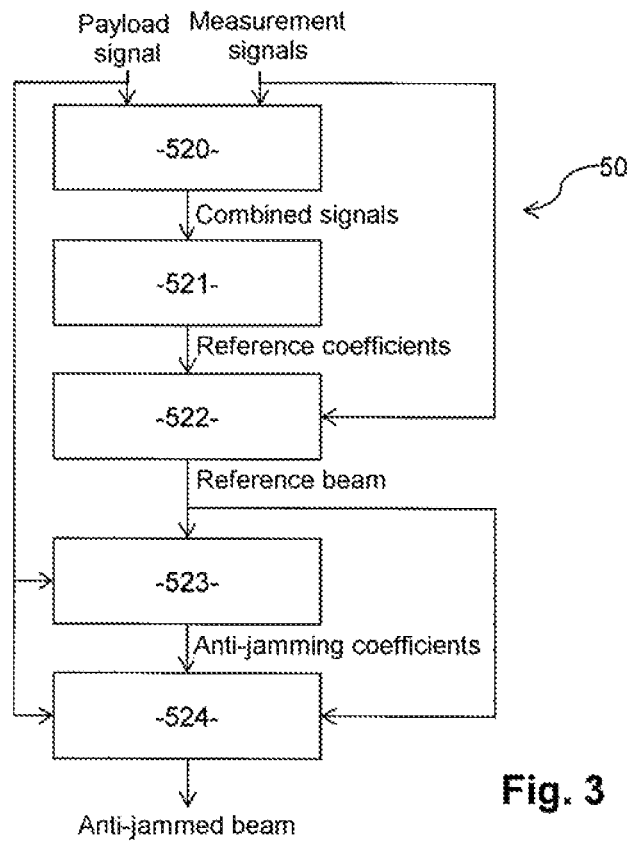
FIG. 3 is a diagram showing the main steps of a method for suppressing a spurious signal.

FIG. 3 schematically shows the main steps of a method 50 for suppressing a spurious signal, which are:
- a step 520 of combining each of the measurement signals with the payload signal;
- a step 521 of determining, as a function of the signals obtained after combination, weighting coefficients, called "reference coefficients", of the measurement signals for forming a beam, called "reference beam", directed toward the spurious transmitter 40 of the spurious signal;
- a step 522 of forming the reference beam by combining the measurement signals by means of the reference coefficients;
- a step 523 of determining, as a function of the payload signal and of the reference beam, weighting coefficients, called "anti jamming coefficients", of said payload signal and of said reference beam for forming a beam, called "anti-jammed beam", in which the spurious signal has been suppressed from the payload signal;
- a step 524 of forming the anti-jammed beam by combining the payload signal and the reference beam by means of the anti-jamming coefficients.

It is to be noted that the various steps of the method 50 for suppressing a spurious signal can be executed in the payload of the satellite 10 and/or in one or more ground stations 30. Therefore, various manners of distributing the steps of the suppression method 50 between the satellite 10 and the ground are possible, and the selection of a particular manner of distribution merely constitutes a variant of the implementation of the invention.

Throughout the remainder of the description, the case in which all the steps of the suppression method 50 are executed on the satellite 10, as shown in a non-limiting manner in FIG. 2, will be considered first.

As shown in FIG. 2, the computation device 140 comprises a set of functional modules for implementing the various steps of the method 50 for suppressing a spurious signal:
- a combination module 141 configured to combine the measurement signals with the payload signal;
- a first computation module 142 configured to determine the reference coefficients;
- a first beam forming module 143 for forming the reference beam;
- a second computation module 144 configured to determine the anti-jamming coefficients;
- a second beam forming module 145 for forming the anti-jamming beam.

During the combination step 520, the combination module 141 combines the payload signal with each of the measurement signals.

The combination allows a processing gain to be introduced that improves the signal-to-noise ratio of the spurious signal (and of the one or more useful signal(s)). In preferred embodiments, the combination corresponds to a correlation of the payload signal with each of the measurement signals. The correlation is, for example, computed in the time domain, or even in the frequency domain, after having computed frequency spectra of the payload signal and of the measurement signals, for example, by means of a "Fast Fourier Transform", or FFT.

Subsequently, the first computation module 142 determines the reference coefficients as a function of the signals supplied by the combination module 141.

The aim of the reference coefficients is to form a reference beam directed toward the spurious transmitter 40. "Directed toward the spurious transmitter" is generally understood to mean that the reference beam aims to supply a signal, in which the signal-to-noise-plus-interference ratio SNIR (the one or more useful signal(s) being considered to be interference) of the spurious signal is improved relative to the ratio in each of the measurement signals. In other words, the reference beam aims to prioritize the reception of the spurious signal by attenuating the one or more useful signal(s) relative to the spurious signal.

The computation of the reference coefficients, which allows a reference beam to be formed that prioritizes the reception of the spurious signal, can implement any suitable method that is known to a person skilled in the art. The main known methods generally perform a statistical analysis of the considered signals, in this case the payload signal and the measurement signals. For example, it is possible to estimate a covariance matrix, called "reference covariance matrix", of said payload signal and of said measurement signals and to determine the reference coefficients as a function of the inverse matrix of said reference covariance matrix. However, other methods exist for determining suitable reference coefficients, which also can be used within the scope of the invention.

The computation of the reference coefficients can comprise, for example, estimating the directions of arrival of the various signals (useful signal and spurious signal) on the basis of the reference covariance matrix, according to any method known to a person skilled in the art. The following methods can be cited by way of non-limiting examples:
- MUSIC (see for example: "Multiple Emitter Location and Signal Parameter Estimation", R. O. Schmidt, IEEE Transactions on Antennas and Propagation, Vol. 34, No. 3, March 1986);
- ESPRIT (see for example: "ESPRIT: Estimation of Signal Parameters via Rotational Invariance Techniques", R. Roy et al., IEEE Transactions on Acoustics, Speech and Signal Processing, Vol. 37, No. 7, July 1989).

From the estimations of the various directions of arrival, it is possible to determine reference coefficients that allow a reference beam to be formed that prioritizes the reception of the spurious signal. The attenuation of the one or more useful signals relative to the spurious signal may be more or less significant. If the conditions so allow, for example, if the number $N_R$ of measurement antennas 130 is greater than the total number of received signals, for example, greater than two in the case of a single spurious signal and a single useful signal, then it is possible to form a reference beam that theoretically has a substantially zero multiplicative gain in the direction of arrival of the useful signal, so as to maximize the SNIR of the spurious signal.

In general, the one or more useful signals are emitted from the service area, which is known a priori. Therefore, it is not necessarily essential for the number and the directions of arrival of the useful signals to be estimated. Indeed, the reference beam can be optimized for the reception of the spurious signal while globally attenuating the useful signals received from the service area.

Once the reference coefficients have been determined, the first beam forming module 143 forms the reference beam by combining the measurement signals by means of said reference coefficients.

Subsequently, the second computation module 144 determines the anti-jamming coefficients as a function of the payload signal and of the reference beam. The aim of the anti-jamming coefficients is to form an anti-jammed beam in which the spurious signal has been fully or partly suppressed.

The computation of the anti-jamming coefficients allowing the anti-jammed beam to be formed can implement any suitable method known to a person skilled in the art. The main known methods generally perform a statistical analysis of the considered signals, in this case the payload signal and the reference beam. For example, it is possible to estimate a covariance matrix, called "anti jamming covariance matrix", of said payload signal and of said reference beam and to determine the anti-jamming coefficients as a function of the inverse matrix of said anti-jamming covariance matrix. However, other methods exist for determining suitable anti-jamming coefficients, which also can be used within the scope of the invention.

In general, it is advantageous for the anti-jamming coefficients to be estimated from the reference beam. Indeed, the SNIR of the spurious signal is better in the reference beam than in the measurement signals, so that the anti-jamming coefficients allowing the spurious signal to be suppressed are estimated with greater accuracy. Furthermore, the anti-jamming covariance matrix that is thus obtained is generally well-conditioned and is easy to invert.

Once the anti-jamming coefficients have been determined, the second beam forming module 145 forms the anti-jammed beam by combining the payload signal and the reference beam, supplied by the first beam forming module 143, by means of said anti-jamming coefficients.

Figure 4:
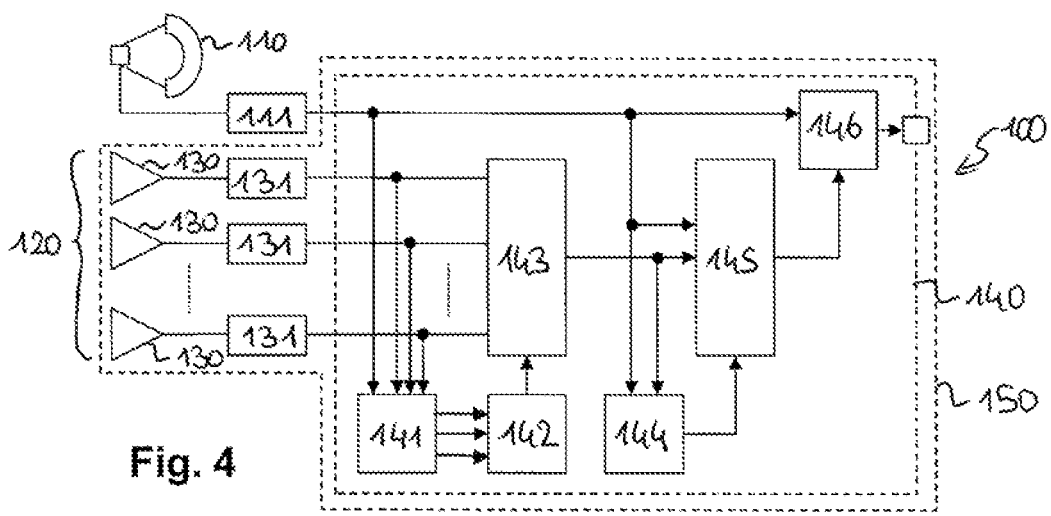
FIG. 4 is a schematic representation of a preferred variant of the suppression device of FIG. 2.

FIG. 4 schematically shows a preferred embodiment, in which the suppression device 150 comprises, in addition to the elements described with reference to FIG. 2, a switching module 146 adapted to supply, on an output, either the payload signal supplied by the reception antenna 110, or the anti-jammed beam supplied by the second beam forming module 145. Such arrangements consequently allow the activation or non-activation of the suppression of the spurious signal depending on whether or not a spurious signal has been detected. Thus, when no spurious signal has been detected, the switching module 146 is controlled to supply the payload signal as output. Conversely, when a spurious signal has been detected, the switching module 146 is controlled to supply the anti-jammed beam as output, in which the spurious signal has been fully or partly suppressed.

Figure 5:
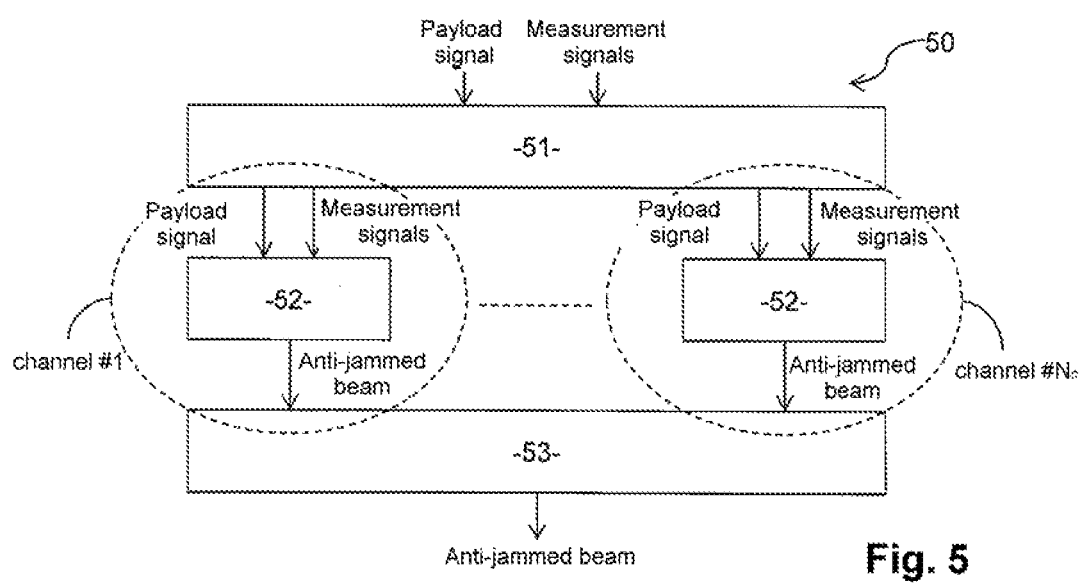
FIG. 5 is a diagram showing a preferred embodiment of a method for suppressing a spurious signal.

FIG. 5 schematically shows a preferred embodiment of the suppression method 50, in which the payload signal and the measurement signals are split into frequency channels. The channels correspond, for example, to adjacent frequency sub-bands inside a predefined frequency band of the useful signals, called "multiplexing band MB". Indeed, better spurious signal suppression performance can be obtained by being located on the channel, i.e. on each frequency sub-band, rather than by globally processing the multiplexing band MB.

As shown in FIG. 5, the suppression method 50 first comprises a step 51 of demultiplexing the channels of the payload signal and the measurement signals.

Therefore, the aim of the demultiplexing step 51 is to split the various channels of the multiplexing band MB in order to be able to form an anti-jammed beam for each channel of said multiplexing band MB.

The splitting of the various channels is preferably performed in the frequency domain by computing, for example, by means of an FFT, a frequency spectrum of the payload signal and frequency spectra of the various measurement signals on the multiplexing band MB. However, nothing rules out splitting the various channels in the time domain, for example, by means of band-pass time filters respectively associated with the various channels.

In the example shown in FIG. 5, $N_C$ is the number of channels, such that, on completion of the demultiplexing step 51, $N_C$ channels are available for the payload signal and $N_C$ channels are available per measurement signal.

The suppression method 50 subsequently comprises, in the preferred embodiment shown in FIG. 5, a step 52 of suppressing the spurious signal. The step 52 of suppressing the spurious signal, which is executed for each channel, preferably uses the steps of the suppression method 50 which were described with reference to FIG. 3. However, the combination step 520 can be executed during the step 52 of suppressing the spurious signal, on a channel-by-channel basis, or before the demultiplexing step 51.

Consequently, the suppression step 52, which is executed for each channel, particularly comprises:

determining 521 reference coefficients for the considered channel, as a function of the signals obtained after combination for said considered channel;
  forming 522 a reference beam for the considered channel, by combining the measurement signals of said considered channel by means of the reference coefficients determined for said considered channel;
  determining 523 anti-jamming coefficients for the considered channel, as a function of the payload signal and of the reference beam of said considered channel;
  forming 524 an anti-jammed beam for the considered channel, by combining the payload signal and the reference beam of said considered channel by means of the anti-jamming coefficients determined for said considered channel.

Therefore, on completion of the various suppression steps 52, $N_C$ anti-jammed beams are available, which are respectively associated with the various channels of the multiplexing band MB.

In the example shown in FIG. 5, the method 50 for suppressing a spurious signal further comprises a step 53 of multiplexing the $N_C$ anti-jammed beams of the various channels, in order to obtain an anti-jammed beam over the entire multiplexing band MB.

In the case in which the suppression step 52 is executed in the frequency domain, the multiplexing step 53 preferably comprises combining, in the frequency domain, the respective frequency spectra of said Nc anti-jammed beams associated with the various channels, and computing a temporal representation of the result of said combination, for example, by "Inverse Fast Fourier Transform", or IFFT.

More generally, it is to be noted that the embodiments and modes of implementation considered above have been described by way of non-limiting examples and that other variants thus can be contemplated.

In particular, the invention has been described by considering that all the steps of the suppression method 50 were executed by the suppression device 150 on board the satellite 10. However, nothing rules out, according to other examples, having all or part of said steps executed on the ground by one or more ground station(s).

According to a first example, all the steps shown in FIG. 3 are executed on the ground, by one or more ground station(s) 30. If necessary, the payload signal and the measurement signals must be transmitted to a ground station 30 by the satellite 10 and the functional modules previously described with reference to FIG. 2 are integrated in one or more ground station(s).

According to another example, all the steps shown in FIG. 3, with the exception of the step 521 of determining reference coefficients, are executed entirely on the satellite 10. The step 521 of determining reference coefficients, the complexity of which increases with the number NR of measurement antennas 130 of the array 120, is at least partly executed on the ground whereas the reference coefficients are applied by the satellite 10. If necessary, the suppression device 150 on board the satellite 10 comprises, for example:

means (not shown in the figures) for transmitting, to a ground station, signals supplied by the combination module 141 and/or data computed on the basis of said signals supplied by said combination module 141, such as the reference covariance matrix;
  means (not shown in the figures) for receiving reference coefficients computed on the ground as a function of said signals supplied by the combination module and/or as a function of said data.

Furthermore, the invention has been described by considering that the various steps of the suppression method 50 were implemented by functional modules of a digital computation device 140. However, nothing rules out, according to other examples, having all or part of said functional modules made from analog components. For example, the switching module 146 can be made from an analogue switch.

Furthermore, the invention has been described by considering the presence of a single spurious signal. However, the invention is applicable to a greater number of spurious signals. For example, it is possible to form a plurality of reference beams respectively associated with the various detected spurious signals and to form the anti-jammed beam on the basis of the payload signal and of said reference signals.

The invention described above is applicable to useful and to spurious signals that may have been transmitted by terminals located either on the ground or at altitude above the surface of the ground (airplane, drone, balloon, satellite). Furthermore, the terminals can be fixed or mobile (automobile, airplane, drone, balloon, train, boat, and used during one movement or between two movements, etc.). It is also possible for moving spurious transmitters 40 to be accommodated by repeatedly updating the reference coefficients. The invention that has been described, due to the fact that it allows self-adaptation to various spurious signals, provides a robust solution in the face of very diverse jamming scenarios: isolated or multiple jammers (grouped or dispersed, fixed or mobile) and having varied jamming properties (fixed or variable by frequency and by time).

The invention described above can be used in any frequency band, the frequency bands that are conventionally used by satellite telecommunications systems can be cited by way of examples, such as: C, L, S, X, Ku, Ka, Q/V.

The invention described above is effective for protecting satellite telecommunications systems operating in various frequency bands and performing civil or military missions, or a combination of both, against interference or jamming. The communications to be protected can relate to any type of digital or analog content likely to be exchanged with a satellite terminal (exchange of documents, telephone conversations, fax data, web page search data, streaming audio or video, etc.).

The use of the invention can also allow:
inter-satellite data exchanges to be protected against interference or jamming;
all or part of the spectrum of another system to be re-used, while tolerating the interference that it generates and that originates from the ground;
local authorization for another system (satellite or not) to re-use all or part of the spectrum of the considered satellite system;
the coordination of the spectrum to be facilitated between close systems to prevent any risk of interference of one system on another.

The invention claimed is:

1. A method for suppressing a spurious signal in a payload signal supplied by a reception antenna of a payload of a satellite, said satellite comprising an array of measurement antennas supplying respective measurement signals, the method comprising steps of:
combining each of the measurement signals with the payload signal;
determining reference weighting coefficients of the measurement signals as a function of signals obtained by combining each of the measurement signals with the payload signal for forming a reference beam directed toward a transmitter of the spurious signal;
forming the reference beam by combining the measurement signals weighted based on corresponding reference weighting coefficients;
determining anti-jamming weighting coefficients of the payload signal and of the reference beam as a function of the payload signal and of the reference beam for forming an anti-jammed beam, in which the spurious signal has been suppressed; and
forming the anti-jammed beam by combining the payload signal and the reference beam weighted based on the corresponding anti-jamming weighting coefficients.

2. The method as claimed in claim 1, wherein the step of combining each of the measurement signals with the payload signal comprises a step of correlating the payload signal with said each of said measurement signals.

3. The method as claimed in claim 2, wherein the correlation is computed in a frequency domain.

4. The method as claimed in claim 1, wherein the reference weighting coefficients are computed on a ground station and are applied by a satellite in order to form the reference beam.

5. The method as claimed in claim 1, wherein the step of determining the reference weighting coefficients comprises steps of computing a reference covariance matrix of the signals obtained by combining said each of the measurement signals with the payload signal; and computing the reference weighting coefficients as a function of the reference covariance matrix.

6. The method as claimed in claim 1, wherein the step of determining the anti-jamming weighting coefficients comprises steps of computing an anti-jamming covariance matrix of the payload signal and of the reference beam; and computing the anti-jamming weighting coefficients as a function of the anti-jamming covariance matrix.

7. The method as claimed in claim 1, wherein the payload signal and the measurement signals are split into frequency channels; and the method further comprises steps of:
determining reference channel weighting coefficients for each channel;
forming, for each channel, a reference channel beam based on the reference channel weighting coefficients determined for said each channel;
determining anti-jamming channel weighting coefficients for said each channel; and
forming, for said each channel, an anti-jammed channel beam based on the anti-jamming channel weighting coefficients determined for said each channel.

8. A payload of a satellite comprising a reception antenna configured to supply a payload signal, wherein the payload comprises a suppressor to suppress a spurious signal in the payload signal, the suppressor comprising:
an array of measurement antennas configured to supply respective measurement signals;
a signal combiner configured to combine each of the measurement signals with the payload signal;
a first beam former configured to form a reference beam, directed toward a transmitter of the spurious signal, by combining the measurement signals weighted based on corresponding reference weighting coefficients, the reference weighting coefficients determined as a function of the signals supplied by the signal combiner; and
a second beam former configured to form an anti-jammed beam, in which the spurious signal has been suppressed, by combining the payload signal and the reference beam weighed based on the corresponding anti jamming weighting coefficients.

9. The payload as claimed in claim 8, further comprising a signal switch configured to supply, on an output of the signal switch, either the payload signal supplied by the reception antenna or the anti-jammed beam supplied by the second beam former.

10. The payload as claimed in claim 8, wherein the signal combiner is configured to correlate the payload signal with each of the measurement signals.

11. The payload as claimed in claim 8, further comprising a processor configured to determine the reference weighting coefficients as a function of the signals supplied by the signal combiner.

12. The payload as claimed in claim 8, further comprising a processor configured to determine the anti-jamming weighting coefficients as a function of the payload signal and of the reference beam.

13. The payload as claimed in claim 8, wherein a maximum gain of the reception antenna is greater than respective maximum gains of the measurement antennas.

14. The payload as claimed in claim 8, further comprising:
- a transmitter to transmit, to a ground station, at least one of signals supplied by the signal combiner and data computed from the signals supplied by the signal combiner; and
- a receiver to receive receiving reference weighting coefficients computed at the ground station as a function of at least one of the signals supplied by the signal combiner and the data computed from the signals supplied by the signal combiner.

15. A satellite comprising a payload as claimed in claim 8.

* * * * *